Nov. 11, 1930.　　　C. J. SCRANTON, JR　　　1,781,198
RECLEANER
Filed May 25, 1928
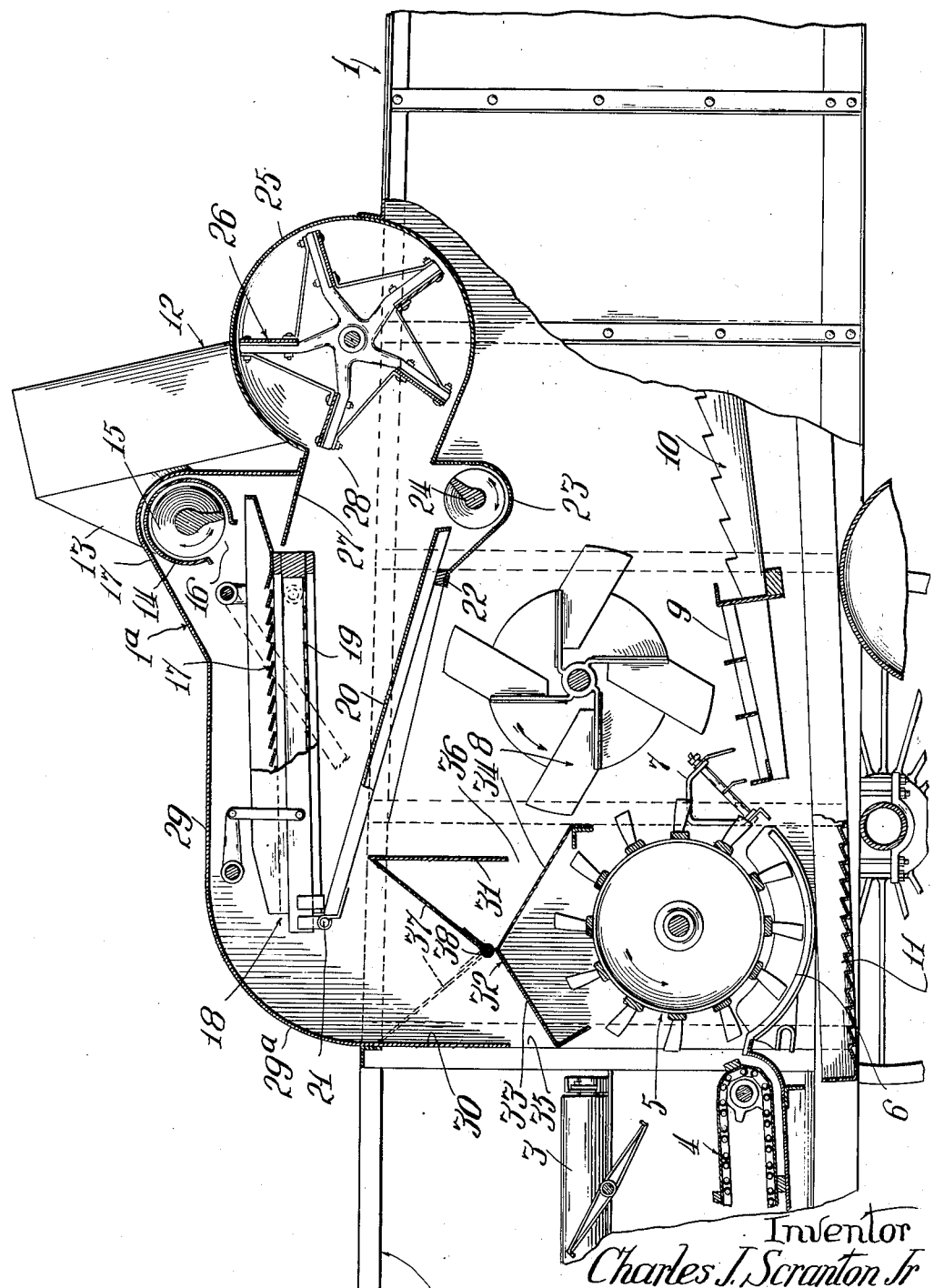
Inventor
Charles J. Scranton Jr
By Brown, Jackson, Boettcher & Diener
Attorneys Patented Nov. 11, 1930

1,781,198

UNITED STATES PATENT OFFICE

CHARLES J. SCRANTON, JR., OF PEORIA, ILLINOIS, ASSIGNOR TO AVERY POWER MACHINERY CO., OF PEORIA, ILLINOIS, A CORPORATION OF ILLINOIS

RECLEANER

Application filed May 25, 1928. Serial No. 280,438.

This invention relates to machines for harvesting and threshing grain, commonly called combines, and more particularly to recleaner means for use in such machines.

In machines of the character stated, the grain, as it is harvested, is delivered into a feeder house containing suitable feeder mechanism, by means of which the harvested grain is delivered to the cylinder and associated concaves. The material discharged from the cylinder is delivered to suitable agitating and separating means or mechanisms which act in a known manner to separate the grain kernels from the straw and chaff. The partially cleaned grain is then fed, by a suitable elevator, to a recleaner, and the tailings from the lower cleaner are fed directly to the cylinder, the tailings from the recleaner being also delivered to the cylinder in a suitable manner.

In some combines, the tailings and the partially cleaned grain from the lower cleaner are not separated, but are mixed together and are fed, by means of a suitable elevator, to a recleaner. This recleaner is commonly disposed above and in rear of the cylinder, the tailings from the recleaner being discharged, by the combined action of a blower and gravity, at the rearward end of the recleaner and away from the cylinder. The tailings from the recleaner are then conveyed, by means of an auger, to a second elevator, which serves to discharge these tailings into the feeder house, such tailings being fed back to the cylinder with the entering harvested grain. The grain kernels, which are separated out in the recleaner, are directed therefrom to a discharge auger which serves to convey such kernels to a bagger or a third conveyor, by means of which the clean kernels may be elevated and discharged into a bin suitably supported above the body of the machine. This is a common form of threshing mechanism used on combines and is well-known in the art.

It is also known to provide a recleaner which is disposed reversely to the recleaner above referred to, that is, is disposed above the cylinder and has its tailings discharge end directed forwardly of the machine. This arrangement has the advantage that the tailings discharged from the recleaner may be delivered to the cylinder without the intermediary of an additional auger and conveyor or elevator, or equivalent means.

This results in materially simplifying the construction of the thresher, as compared to the thresher commonly used, above discussed, in which the recleaner is disposed in rear of the cylinder and the tailings from this recleaner are discharged from the rear end thereof.

My invention has to do particularly with the second type of thresher, in which the tailings from the recleaner are discharged from the forward end thereof and above the cylinder. While this arrangement of the recleaner is very satisfactory, in many respects, it is open to the objection that the tailings discharged therefrom are, at all times, delivered to the cylinder and, accordingly, subjected to the action thereof. This is desirable when harvesting and threshing grain which is thoroughly ripe and dry and is free from weeds. There are cases, however, where the tailings from the recleaner should not be delivered to the cylinder. This is particularly true in harvesting weedy grain. The weeds are taken in with the harvested grain and, being green, contain a relatively large amount of moisture. During the passage of the harvested grain between the cylinder and the concaves, these weeds are largely torn apart and disintegrated and portions thereof enter the tailings from the agitating and separating mechanisms, such portions of these weeds being returned to the recleaner. If, under such conditions, the tailings from the recleaner are delivered to the cylinder, the weed particles contained therein will be further broken up and disintegrated, so as to be in a comparatively finely comminuted condition, and a portion of these weed particles will be pulverized, so as to form, in effect, a moist powder which will adhere to the grain kernels and cannot be effectively removed therefrom.

If the grain, with the intermixed particles of the moist weeds, is placed in bins, it will quickly heat and sweat, spoiling the grain. This is, from a practical standpoint, a serious objection to this type of recleaner. I have found, however, that this objection can be overcome by providing means whereby the tailings from the recleaner, when harvesting weedy grain, can be delivered to the agitating and separating mechanisms in rear of the cylinder, thus avoiding the disintegration and pulverizing of the weed particles referred to, while effectively separating the free grain kernels from such tailings.

The primary object of my invention is to provide simple and efficient means whereby the tailings from the recleaner can be delivered either to the cylinder or to the agitating and separating mechanisms in rear of the cylinder, optionally. A further object is to provide means of this character, which can be readily applied to combines of known construction, without necessitating material changes therein. Further objects and advantages will appear from the detailed description.

The single figure of the drawing is a sectional view, through the forward portion of a combine, showing my invention as applied, parts being shown in elevation, the drawing being semi-diagrammatic.

I have illustrated my invention as applied to the thresher of a combine, the casing of the thresher being indicated in its entirety by the reference number 1. A feeder house 2 is provided at the front of casing 1 and receives the harvested grain delivered thereto from the harvesting mechanism by a suitable conveyor 3.

A feeder 4 is disposed within the feeder house 2 and delivers the harvested grain to cylinder 5 and the concave 6. The material discharged from the cylinder, over cylinder grate 7, is delivered to a beater 8, above and in rear of the cylinder which acts to spread this material and to beat it down upon and drag it over beater grate 9, disposed below the beater. This grate is carried by a straw rack 10, of known type, which is reciprocated in a known manner. The grain kernels, separated from the straw and heads, fall upon a grain pan 11, of known type, which is also reciprocated, and are discharged into a suitable sieve structure, which serves to separate the main bulk of the chaff from the grain. The partially cleaned grain, or the mixture of the partially cleaned grain and the tailings from the lower cleaner, as the case may be, is then delivered in a suitable manner to a return elevator 12 having a discharge spout 13 which delivers the tailings into a trough or casing 14 of a spreader or distributor auger 15. The auger casing is provided with a suitable discharge opening 16, through which the tailings are distributed and discharged upon an upper screen 17, of known type, of a screen structure 18. The term "tailings", as here used, is applied in its broadest sense as referring to either partially cleaned grain or a mixture of grain and other materials discharged from the lower cleaner. It includes either the partially cleaned grain from the lower cleaner, or the tailings proper from the lower cleaner, or a mixture of such partially cleaned grain and tailings from the lower cleaner, as distinguished from the completely cleaned grain.

The screen structure 18 is mounted for reciprocation forwardly and rearwardly of casing 1 and is open at its forward end.

This structure includes a lower screen 19, disposed in alignment with screen 17, and a board or plate 20, hinged at its forward end, at 21, to the forward end of the screen structure 18. The rearward portion of board 20 rests upon a cross-bar 22, suitably secured in casing 1.

The board 20 delivers the kernels, which pass through the screens 17 and 19, to a trough 23, in which operates a discharge auger 24. This auger delivers the grain kernels exteriorly of the machine, to a bagger, a discharge spout, or an elevator, as desired.

The auger casing or trough 23 extends from the forward lower edge of a blower casing 25, within which is mounted a centrifugal blower 26, of known type. The casing 25 is provided at its upper edge, with an upwardly and forwardly extending flange 27, serving to direct the air discharged through opening 28 upwardly through the sieve and over the same, toward the front of casing 1. The screens 17 and 19, together with the blower 26 and associated parts, constitute the recleaner, which, as will be noted, is disposed to discharge the tailings therefrom above the cylinder 5, the air from the blower 26 flowing forwardly of casing 1.

The recleaner is covered, and is largely enclosed, by a casing 1ª, which includes the blower housing or casing 25 and an extension or housing 27 for the auger 15 and associated parts. The casing 1ª also includes a hood 29 having its forward portion 29ª curved forwardly and downwardly and extended into casing 1 to form a forward baffle wall 30. This wall coacts with portion 29ª of the hood 29 to direct the tailings from the recleaner downwardly toward the cylinder 5. A baffle wall 31 extends transversely of the casing 1 and is disposed above the rearward portion of cylinder 5.

This wall 31 defines, with the wall 30, and the side walls of casing 1, a space or compartment for reception of the tailings discharged from the recleaner.

A deflector 32 is suitably supported transversely of casing 1, above cylinder 5. This deflector is of approximately inverted flattened V-shape and includes a front element or plate 33, which is inclined downwardly and forwardly of casing 1, and a rear plate or element 34, which is inclined downwardly and rearwardly of casing 1. The lower edge of baffle wall 30 is spaced away from element 33 to provide an outlet opening 35, and the lower edge of wall 31 is spaced away from plate 34 to provide a similar outlet opening 36. A baffle plate 37 extends transversely of casing 1 above member 32 and is secured, at its lower edge, upon a shaft 38, which is rockably mounted through the side walls of casing 1 and is disposed adjacent the vertex of the deflector 32. Plate 37 is preferably of proper length to contact with baffle wall 30, at its upper edge, when in one extreme position, and with baffle wall 31, when in its other extreme position. The shaft 38 may be provided with any suitable means for rocking the same and, if desired, the plate 37 can be held in an intermediate position, in order to avoid back pressure, by suitably securing the shaft 38.

When harvesting ripe, dry grain, the baffle plate 37 is turned into the full line position illustrated. Under such conditions, the tailings discharged from the recleaner are delivered therefrom, by means of the plate 37 and element 33 of deflector 32, to the feeder 4, which delivers the tailings, with the harvested grain, to the cylinder and concave.

This has the advantage that any heads in the tailings are passed through the cylinder and concave, so as to have the kernels separated therefrom. When harvesting weedy grain or when, for any other reason, it is desired that the tailings from the recleaner not pass through the cylinder a second time, the baffle plate 37 is turned into the position indicated by dotted lines. The tailings discharged from the recleaner are then deflected by the plate 37 and member 34, so as to be delivered from the latter to the beater 8 in back of the cylinder 5, such tailings be again passed through the agitating and separating mechanism, but without being a second time subjected to the action of the cylinder and concave. This has the advantage, previously referred to, of effectively cleaning and separating the grain, while preventing intermixing with the clean kernels of weeds or particles thereof, such as would be apt to cause heating and sweating of the grain in the bins with consequent loss thereof.

While I have referred, more particularly, to weeds as being objectionable, there are other materials which should also be excluded from the clean kernels of the grain being harvested and threshed. This is particularly true of the seeds of weeds which may be harvested with weedy grain, such seeds, not being ripe, containing appreciable moisture, which, if the weed seeds were intermixed with the grain kernels in appreciable quantities, would cause heating and sweating of the grain.

By discharging or delivering tailings from the recleaner to the agitating and separating mechanisms, without passing such tailings through the cylinder, when harvesting weedy grain, I not only avoid intermixing particles of the weed plants with the grain kernels, but also exclude the weed seeds. So far as I am aware, it has never before been proposed to provide means whereby the tailings discharged from a recleaner can be delivered either to the cylinder or to the agitating and separating mechanisms without passing through the cylinder, and I believe this to be broadly new.

When harvesting grain which is unusually dry and ripe the heads shell out so completely that there is no advantage in delivering the tailings in front of the cylinder for re-threshing. In fact, delivery of the tailings to the cylinder is objectionable, as the grain kernels, when extremely dry, are apt to be cracked and shattered by the cylinder teeth. Under such conditions, therefore, i. e., when threshing grain which is unusually ripe and dry, I dispose the plate 37 so as to direct the tailings behind the cylinder in the same manner as when threshing weedy grain. This is advantageous as preventing cracking of the grain and, also, as materially increasing the capacity of the machine.

The feeder, cylinder, beater, grain pan, racks, augers, elevator, recleaner, and associated mechanisms are all operated in a known manner well understood by those skilled in the art, and it is not thought necessary or desirable to illustrate or describe in detail such operating means.

The baffle plate 37 is really a two-way valve which acts to control the flow of the tailings from the recleaner, and to direct such tailings to either the cylinder or the beater, as desired.

What I claim is:

1. In combination in a threshing machine comprising an initial threshing cylinder and associated agitating and separating mechanisms for receiving material delivered from the cylinder, a recleaner, means for delivering the grain from said mechanisms to the recleaner, and shiftable means for delivering the tailings from the recleaner either to the cylinder or in rear thereof to the separating and agitating mechanisms, optionally.

2. In combination in a threshing machine comprising an initial threshing cylinder and associated agitating and separating mechanisms for receiving material delivered from the cylinder, a feeder housing, feeder means in the housing for feeding the harvested grain to the cylinder, a recleaner, means for delivering the grain from said mechanisms to the recleaner, and shiftable means for delivering the tailings from the recleaner either to said feeder means or in rear of the cylinder to the separating and agitating mechanisms, optionally.

3. In combination in a threshing machine comprising an initial threshing cylinder and associated agitating and separating mechanisms for receiving material delivered from the cylinder, a beater in rear of the cylinder, a recleaner, means for delivering the grain from said mechanisms to the recleaner, and shiftable means for delivering the tailings from the recleaner to either the cylinder or the beater, optionally.

4. In combination in a threshing machine comprising an initial threshing cylinder and associated agitating and separating mechanisms for receiving material delivered from the cylinder, a recleaner disposed to discharge above the cylinder, means for delivering the grain from said mechanisms to the recleaner, and shiftable means for delivering the tailings from the recleaner to the cylinder or the agitating and separating mechanisms, optionally.

5. In combination in a threshing machine comprising an initial threshing cylinder and associated agitating and separating mechanisms for receiving material delivered from the cylinder, a recleaner, disposed to discharge the tailings therefrom above and in substantial alignment with the cylinder, means for delivering the grain from said mechanisms to the recleaner, and shiftable means for delivering the tailings from the recleaner to either the cylinder or the agitating and separating mechanisms, optionally.

6. In combination in a threshing machine comprising an initial threshing cylinder and associated agitating and separating mechanisms for receiving material delivered from the cylinder, a recleaner disposed to discharge the tailings therefrom above the cylinder, means for delivering the grain from said mechanisms to the recleaner, and baffle and deflector means for delivering the tailings from the recleaner to either the cylinder or the agitating and separating mechanisms, optionally.

7. In combination in a threshing machine comprising an initial threshing cylinder and associated agitating and separating mechanisms for receiving material delivered from the cylinder, a recleaner disposed to discharge the tailings therefrom above the cylinder, means for delivering the grain from said mechanisms to the recleaner, a deflector between the recleaner and the cylinder, and an adjustable baffle plate cooperating with the deflector for delivering the tailings from the recleaner to either the cylinder, or the agitating and separating mechanisms, optionally.

8. In combination in a threshing machine comprising an initial threshing cylinder and associated agitating and separating mechanisms, a recleaner disposed to discharge the tailings therefrom above the cylinder, said recleaner including a screen structure and a blower discharging through the screen structure toward the tailings discharge end thereof, a hood structure extending over the recleaner and having its forward portion disposed to direct the tailings from the recleaner downwardly toward the cylinder, means for delivering the grain from said mechanisms to the recleaner, and shiftable means for delivering the tailings from said recleaner to either the cylinder or the agitating and separating mechanisms, optionally.

9. In combination in a threshing machine comprising an initial threshing cylinder and associated agitating and separating mechanisms, a recleaner disposed to discharge the tailings therefrom above the cylinder, means for delivering the grain from said mechanisms to the recleaner, a deflector extending over the cylinder and having a downwardly and forwardly inclined front element and a downwardly and rearwardly inclined back element, and a baffle plate rockably mounted at its lower edge adjacent the apex of the deflector and cooperating therewith to deliver the tailings from the recleaner to either the cylinder or the agitating and separating mechanisms, optionally.

10. In combination, in a threshing machine comprising an initial threshing cylinder and associated agitating and separating mechanisms, a recleaner disposed to discharge the tailings therefrom above the cylinder, means for delivering the grain from said mechanisms to the recleaner, a deflector extending over the cylinder and having a downwardly and forwardly inclined front element and a downwardly and rearwardly inclined back element, a beater in back of said cylinder, and a baffle plate rockably mounted at its lower edge adjacent the apex of the deflector and cooperating therewith to deliver the tailings from the recleaner to either the cylinder or the beater, optionally.

11. In combination in a threshing machine comprising an initial threshing cylinder and associated agitating and separating mechanisms, a recleaner disposed to discharge the tailings therefrom above the cylinder, means for delivering the grain from said mechanisms to the recleaner, a deflector extending over the cylinder and having a downwardly and forwardly inclined front element and a downwardly and rearwardly inclined back element, baffle walls extending transversely of the deflector adjacent the front and the rear thereof, the lower edges of the walls being spaced above the deflector and said walls receiving between them the tailings discharged from the recleaner, and a baffle plate rockably mounted at its lower edge adjacent the apex of the deflector and cooperating therewith to deliver the tailings from the recleaner to either the cylinder or the agitating and separating mechanisms, optionally.

12. In combination in a threshing machine comprising an initial threshing cylinder and associated agitating and separating mechanisms for receiving material delivered from the cylinder, a recleaner disposed to discharge the tailings therefrom above the cylinder, means for delivering the grain from said mechanisms to the recleaner, and a baffle plate between the tailings discharge end of the recleaner and the cylinder, said baffle plate being adjustable to direct the recleaner tailings forwardly of the cylinder or rearwardly thereof, optionally.

13. In combination in a threshing machine comprising an initial threshing cylinder and associated agitating and separating mechanisms for receiving materials delivered from the cylinder, a recleaner disposed to discharge the tailings therefrom above the cylinder, means for delivering the grain from said mechanisms to the recleaner, and shiftable means for delivering the tailings from the recleaner either in front of the cylinder or in rear of the cylinder, optionally.

14. In combination in a threshing machine comprising an initial threshing cylinder and associated agitating and separating mechanisms for receiving materials delivered from the cylinder, said mechanisms including a straw rack, a tailings elevator, and selective means for delivering materials discharged from the elevator either in front of the cylinder or in rear of the cylinder adjacent thereto and above the straw rack.

15. In combination in a threshing machine comprising an initial threshing cylinder and associated agitating and separating mechanisms for receiving materials delivered from the cylinder, a tailings elevator, and selective means for delivering materials discharged from the elevator either in front of the cylinder or in rear of the cylinder and adjacent thereto and to the agitating and separating mechanisms.

In witness whereof, I hereunto subscribe my name this seventh day of May, 1928.

CHARLES J. SCRANTON, JR.